(12) United States Patent
Wine et al.

(10) Patent No.: US 11,299,260 B2
(45) Date of Patent: Apr. 12, 2022

(54) SYSTEMS AND METHODS FOR ACTIVE CONTROL OF SURFACE DRAG

(71) Applicant: Deep Science, LLC, Bellevue, WA (US)

(72) Inventors: David William Wine, Seattle, WA (US); Roderick A. Hyde, Redmond, WA (US); Brian C. Holloway, Snoqualmie, WA (US)

(73) Assignee: Deep Science, LLC, Bellevue, WA (US)

( * ) Notice: Subject to any disclaimer, the term of this patent is extended or adjusted under 35 U.S.C. 154(b) by 369 days.

(21) Appl. No.: 16/518,583

(22) Filed: Jul. 22, 2019

(65) Prior Publication Data

US 2020/0031456 A1 Jan. 30, 2020

Related U.S. Application Data

(60) Provisional application No. 62/702,746, filed on Jul. 24, 2018.

(51) Int. Cl.
| | | |
|---|---|---|
| *B64C 21/10* | (2006.01) | |
| *F15D 1/00* | (2006.01) | |
| *B64C 21/08* | (2006.01) | |

(52) U.S. Cl.
CPC .............. *B64C 21/08* (2013.01); *B64C 21/10* (2013.01); *B64C 2230/08* (2013.01); *F15D 1/007* (2013.01)

(58) Field of Classification Search
CPC ..... B64C 23/06; B64C 23/04; B64C 2230/26; B64C 21/10; F15D 1/007
See application file for complete search history.

(56) References Cited

U.S. PATENT DOCUMENTS

| | | | |
|---|---|---|---|
| 1,903,823 A | 4/1933 | Lougheed | |
| 2,440,198 A | 4/1948 | Green | |
| 3,289,978 A | 12/1966 | Banaszak | |
| 3,578,264 A | 5/1971 | Kuethe | |
| 4,309,901 A | 1/1982 | Rolinski et al. | |

(Continued)

FOREIGN PATENT DOCUMENTS

| | | |
|---|---|---|
| EP | 2 012 139 A1 | 1/2009 |
| FR | 1053332 A | 2/1954 |

(Continued)

OTHER PUBLICATIONS

PCT International Search Report; International App. No. PCT/US2019/042832; dated Oct. 22, 2019; pp. 1-4.
Gouder al., "Turbulent Friction Drag Reduction Using electroactive Polymer & Electromagnetically-drive Surfaces", Jan. 17, 2013, Experiments in Fluids, vol. 53, pp. 1-13.

(Continued)

*Primary Examiner* — Richard R. Green
*Assistant Examiner* — Madison Elizabeth Dittner
(74) *Attorney, Agent, or Firm* — Foley & Lardner LLP

(57) ABSTRACT

A fluid control system includes a deformable surface that covers a body in at least a first and second direction. The first direction is orthogonal to the second direction. The deformable surface includes a bottom side that faces the body and a top side that is opposite the bottom side. The fluid control system also includes at least one deformer between the deformable surface and the body. The at least one deformer is configured to modify a boundary layer of a fluid that is flowing over the deformable surface by selectively deforming the top side of the surface.

26 Claims, 18 Drawing Sheets

(56) References Cited

U.S. PATENT DOCUMENTS

| | | | |
|---|---|---|---|
| 4,526,031 A | 7/1985 | Weisend et al. | |
| 4,611,492 A | 9/1986 | Koosmann | |
| 5,106,017 A | 4/1992 | Hicks | |
| 5,359,574 A | 10/1994 | Nadolink | |
| 5,365,490 A | 11/1994 | Katz | |
| 5,369,345 A | 11/1994 | Phan et al. | |
| 5,374,011 A | 12/1994 | Lazarus et al. | |
| 5,445,346 A * | 8/1995 | Gilbert | B64C 23/06 244/197 |
| 5,531,407 A | 7/1996 | Austin et al. | |
| 5,540,406 A | 7/1996 | Occhipinti | |
| 5,558,156 A | 9/1996 | Tsutsui | |
| 5,558,304 A | 9/1996 | Adams | |
| 5,573,012 A | 11/1996 | McEwan | |
| 5,755,408 A | 5/1998 | Schmidt et al. | |
| 5,808,210 A | 9/1998 | Herb et al. | |
| 5,874,671 A | 2/1999 | Lopez | |
| 5,942,682 A | 8/1999 | Ghetzler et al. | |
| 5,953,773 A | 9/1999 | Asada et al. | |
| 5,957,413 A | 9/1999 | Glezer et al. | |
| 5,961,080 A | 10/1999 | Sinha | |
| 5,988,568 A | 11/1999 | Drews | |
| 6,016,286 A | 1/2000 | Olivier et al. | |
| 6,024,119 A | 2/2000 | Kirschner | |
| 6,109,565 A | 8/2000 | King, Sr. | |
| 6,123,145 A | 9/2000 | Glezer et al. | |
| 6,332,593 B1 | 12/2001 | Kamiadakis et al. | |
| 6,484,971 B2 | 11/2002 | Layukallo | |
| 6,644,598 B2 | 11/2003 | Glezer et al. | |
| 6,662,647 B2 | 12/2003 | Schoess et al. | |
| 6,795,763 B2 | 9/2004 | Yao et al. | |
| 6,821,090 B1 | 11/2004 | Hassan et al. | |
| 6,862,502 B2 | 3/2005 | Peltz et al. | |
| 6,871,816 B2 | 3/2005 | Nugent et al. | |
| 6,874,748 B2 | 4/2005 | Hanagan | |
| 6,966,231 B2 | 11/2005 | Sheplak et al. | |
| 6,979,050 B2 | 12/2005 | Browne et al. | |
| 7,031,871 B2 | 4/2006 | Severson et al. | |
| 7,133,785 B2 | 11/2006 | Larson et al. | |
| 7,204,731 B2 | 4/2007 | Gusler | |
| 7,251,592 B1 | 7/2007 | Praisner et al. | |
| 7,375,911 B1 | 5/2008 | Li et al. | |
| 7,434,170 B2 | 10/2008 | Novak et al. | |
| 7,703,839 B2 | 4/2010 | McKnight et al. | |
| 7,854,467 B2 | 12/2010 | McKnight et al. | |
| 7,913,928 B2 | 3/2011 | Tiliakos et al. | |
| 9,908,616 B1 * | 3/2018 | Horn | B64D 31/06 |
| 10,543,908 B2 * | 1/2020 | Stefes | B64C 9/14 |
| 2002/0131474 A1 | 9/2002 | Suga | |
| 2004/0197519 A1 | 10/2004 | Elzey et al. | |
| 2004/0249257 A1 | 12/2004 | Tupin et al. | |
| 2005/0121240 A1 | 6/2005 | Aase et al. | |
| 2006/0022092 A1 | 2/2006 | Miller et al. | |
| 2006/0060722 A1 * | 3/2006 | Choi | B64C 23/06 244/200.1 |
| 2006/0236777 A1 | 10/2006 | Chambers et al. | |
| 2007/0113932 A1 | 5/2007 | Tiliakos et al. | |
| 2008/0128027 A1 | 6/2008 | Hyde et al. | |
| 2008/0128560 A1 | 6/2008 | Hyde et al. | |
| 2008/0128561 A1 | 6/2008 | Hyde et al. | |
| 2008/0193307 A1 | 8/2008 | Elata et al. | |
| 2011/0295102 A1 | 12/2011 | Lakkis et al. | |
| 2015/0257653 A1 | 9/2015 | Hyde et al. | |
| 2016/0089052 A1 | 3/2016 | Cho et al. | |
| 2016/0174842 A1 | 6/2016 | Hyde et al. | |

FOREIGN PATENT DOCUMENTS

| | | | |
|---|---|---|---|
| WO | WO 02/103304 A2 | 12/2002 | |
| WO | WO-2006/040532 A1 | 4/2006 | |
| WO | WO-2012/054086 A1 | 4/2012 | |
| WO | WO 2016/179405 A1 | 11/2016 | |

OTHER PUBLICATIONS

Ainajjar et al., "Receptivity of High-Speed Jets to Excitation Using an Array of Mems-based Mechanical Actuators", ASME Fluids Engineering Division Summer Meeting, Jun. 22-26, 1997, pp. 1-6.

Bird et al., "Compliant Kagome Lattice Structures for Generating in-plane Waveforms", Jun. 1, 2018, vol. 141-142, pp. 86-101.

Bird et al., "Experimental Control of Turbulent Boundary Layers with In-plane Travelling Waves", May 14, 2018, Flow Turbulence Combust, vol. 100, pp. 1015-1035.

Bird et al., "In-Plane Forcing of a Turbulent Boundary Layer, Through the Actuation of a Compliant Structure", EDRFCM, Mar. 23-26, 2015, pp. 1-2.

Braslow, "A History of Suction-Type Laminar-Flow Control with Emphasis on Flight Research", Jan. 1, 1999, pp. 1-84.

Bushnell, "Chapter VIII: Compliant Surfaces Introduction", Viscous Flow Drag Reduction, Jan. 1, 1980, pp. 387-390.

Chamorro et al., "Drag Reduction of Large Wind Turbine Blades through Riblets: Evaluation of Riblet Geometry and Application Strategies", Feb. 2013, Renewable Energy, vol. 50, pp. 1095-1105.

Examination Report issued on GB0911332.5 dated Mar. 31, 2011, 4 pages.

Examination Report issued on GB0911333.3 dated Oct. 25, 2010, 2 pages.

Gad-El-Hak and Bushnell, "Separation Control: Review", Journal of Fluids Engineering, Mar. 1991, vol. 113, pp. 5-30.

Gad-El-Hak, "Chapter 9: Drag Reduction Using Compliant Walls", Flow Past Highly Compliant Boundaries and in Collapsible Tubes, Eds. Carpenter and Pedley, Mar. 26-31, 2001, pp. 191-229.

Gatti and Quadrio et al., "Reynolds-number Dependence of Turbulent Skin-friction Drag Reduction Induced by Spanwise Forcing", Sep. 10, 2016, J. Fluid Mech., vol. 802, pp. 553-582.

Gatti, "Turbulent Drag Reduction at Moderate Reynolds Number via Spanwise Velocity Waves", PAMML, Dec. 3, 2012, pp. 1-132.

Grosjean et al., "Micro Balloon Actuators for Aerodynamic Control", Jan. 25-28, 1998, IEEE Proceedings MEMS 98, pp. 1-6.

Hong et al., "Turbulent Drag Reduction with Polymers in Rotating Disk Flow", Jul. 13, 2015, Polymers, vol. 7, pp. 1279-1298.

Huang et al., "MEMS Transducers for Aerodynamics—A Paradym Shift", 38th Aerospace Sciences Meeting, Jan. 10-13, 2000, pp. 1-7.

Hurst et al., "The Effect of Reynolds Number on Turbulent Drag Reduction by Streamwise Travelling Waves," Nov. 25, 2014, J. Fluid Mech., vol. 759, pp. 28-55.

Jones et al., "Modelling for Robust Feedback Control of Fluid Flows", Feb. 2015, Journal of Fluid Mechanics, vol. 769, pp. 1-34.

Jung et al., "Suppression of Turbulence in Wall-bounded flows by High-frequency Spanwise Oscillations", Aug. 1992, Phys. Fluids A, vol. 4, No. 8, pp. 1605-1607.

Kang and Choi, "Active Wall Motions for Skin-Friction Drag Reduction", Dec. 2000, Physics of Fluids, vol. 12, No. 12, pp. 3301-3304.

Karniadakis and Choi, "Mechanism on Transverse Motions in Turbulent Wall Flows", Jan. 2003, Annu. Rev. Fluid Mech., vol. 35, pp. 45-62.

Kasagi et al., "Toward Cost-Effective Control of Wall Turbulence of Skin Friction Drag Reduction", Sep. 7-10, 2009, Advances in Turbulence XII, pp. 189-200.

Laadhari et al., "Turbulence Reduction in a Boundary Layer by a Local Spanwise Oscillating Surface", Oct. 1994, Physics of Fluids, vol. 6, pp. 3218-3220.

Lee et al., "Control of Roll Moment by MEMS", American Society of Mechanical Engineers, Dec. 1, 1996, pp. 797-803.

Luhar et al., "A Framework for Studying the Effect of Compliant Surface on Wall Turbulence", Apr. 10, 2015, J. Fluid Mech., vol. 768, pp. 415-441.

Melton et al., "Active Flow Control via Discrete Sweeping and steady Jets on a Simple-Hinged Flap", Aug. 2018, AIAA Journal, vol. 56, No. 8, pp. 2961-2973.

(56) References Cited

OTHER PUBLICATIONS

Morrison, "MEMS Devices for Active Drag Reduction in Aerospace Applications", Mar. 27, 2014, Electronic and Optical Materials, pp. 153-176.
Naguib et al., "Arrays of MEMS-based Actuators for Control of Supersonic Jet Screech", AIAA, Jun. 29-Jul. 2, 1997, pp. 1-9.
Quadrio and Ricco, "The Laminar Generalized Stokes Layer and Turbulent Drag Reduction", Jan. 25, 2011, J. Fluid. Mech., vol. 667, pp. 135-157.
Quardio et al., "Streamwise-traveling Waves of Spanwise Wall Velocity for Turbulent Drag Reduction", May 25, 2009, vol. 627, pp. 161-178.
Ricco, "Active and Passive Turbulent Drag Reduction" Workshop on Turbulent Skin Friction Drag Reduction, Imperial College London, Dec. 4-5, 2017, pp. 1-60.
Sareen et al., "Drag Reduction Using Riblet Film Applied to Airfoils for Wind turbines", 49th Aerospaces Sciences Meeting, Jan. 4-7, 2011, pp. 1-19.
Schroder, "Drag Reduction via Transversal Wave Motions", Institute of Aerodynamics, Jul. 2017, pp. 1-22.
Shen, "Turbulent Flow over a Flexible Wall Undergoing a Streamwise Travelling Wave Motion", Jun. 10, 2003, J. Fluid Mech., vol. 484, pp. 197-221.
Symeonidis and Karniadakis, "Drag Reduction in Wall-Bound Turbulence via a Transverse Travelling Wave", J. Fluid Mech,. vol. 457, pp. 1-34.
Tamano, "Turbulent Drag Reduction due to Spanwise Traveling Waves with Wall Deformation", Nov. 20, 2014 FOR 1779 Symposium, pp. 1-51.
Tomiyama and Fukagata, "Direct Numerical Simulation of Drag Reduction in a Turbulent Channel Flow Using Spanwise Traveling Wave-like Wall Deformation", Oct. 2013 Physics of Fluids, vol. 25, pp. 1-22.
Tsao, "An Integrated MEMS System for Turbulent Boundary Layer Control", Jul. 1997, IEEE Solid State Sensors and Actuators, pp. 1-4.
Tsao, "Micromachined Magnetic Actuators for Active Fluid Control", 1994 International Mechanical Engineering Congress and Exposition, Dec. 1, 1994, pp. 31-38.
Van Buren and Amitay, "Piezoelectric Driven Oscillating Surface (PDOS)", RPI, 2014, 6 pages.
Viotti et al., "Streamwise Oscillation of Spanwise Velocity at the Wall of a Channel for Turbulent Drag Reduction", Oct. 2009, Physics of Fluids, vol. 21, pp. 1-9.
Wang, "Flow over a Surface with Parallel Grooves", May 2003, vol. 15, No. 5, pp. 1114-1121.
Yang et al., "Micro Bellow Actuators", IEEE International Solid State Sensors and Actuators Conference, Jun. 19, 1997, pp. 1-4.
Zhao et al., "Turbulent Drag Reduction by Traveling Wave of Flexible Wall", Mar. 31, 2004, Fluid Dynamics Research, vol. 34, pp. 175-198.
Zhong et al., "Reduction of Pressure Losses in a Linear Cascade Using Herringbone Riblets", School of Mechanical, Aerospace and civil Engineering, University of Manchester, Aug. 17, 2017, 16 pages.

* cited by examiner

SYSTEMS AND METHODS FOR ACTIVE CONTROL OF SURFACE DRAG

CROSS-REFERENCE TO RELATED APPLICATIONS

The present disclosure claims the benefit of and priority to U.S. Provisional Application No. 62/702,746, titled "SYSTEMS AND METHODS FOR ACTIVE CONTROL OF SURFACE DRAG," filed Jul. 24, 2018, the disclosure of which is incorporated herein by reference in its entirety.

BACKGROUND

The present disclosure relates generally to the field of fluid flow over surfaces. More particularly, the present disclosure relates to systems and methods for active control of surface drag.

Surface drag is a force that acts opposite to the relative motion of an object moving through a fluid. Air, water, and ground transportation platforms experience some measure of surface drag, which can lead to slower speeds and less fuel efficiency.

SUMMARY

At least one aspect relates to a fluid control system that includes a surface that covers a body in at least a first and second direction. The first direction is orthogonal to the second direction. The surface includes a bottom side that faces the body and a top side that is opposite the bottom side. The fluid control system also includes at least one movable section on the top side of the surface. The at least one movable section is configured to modify a boundary layer of a fluid flowing over the surface by moving along the top side of the surface.

At least one aspect relates to a method that includes using a sensor to measure a parameter of a fluid flowing over a surface. A control signal is generated by a control circuit to modify the parameter, and this control signal is transmitted by the control circuit to at least one separate movable section on the top side of the surface. The at least one separate movable section then is moved to modify the parameter of the fluid.

At least one aspect relates to a fluid control system that includes a deformable surface that covers a body in at least a first and second direction. The first direction is orthogonal to the second direction. The deformable surface includes a bottom side that faces the body and a top side that is opposite the bottom side. The fluid control system also includes at least one deformer between the deformable surface and the body. The at least one deformer is configured to modify a boundary layer of a fluid that is flowing over the deformable surface by selectively deforming the top side of the surface.

At least one aspect relates to a method that includes using a sensor to measure a parameter of a fluid flowing over a surface. A control signal is generated by a control circuit to modify the parameter, and this control signal is transmitted by the control circuit to at least one deformer. The at least one deformer then selectively deforms the top side of the surface to modify the parameter of the fluid.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
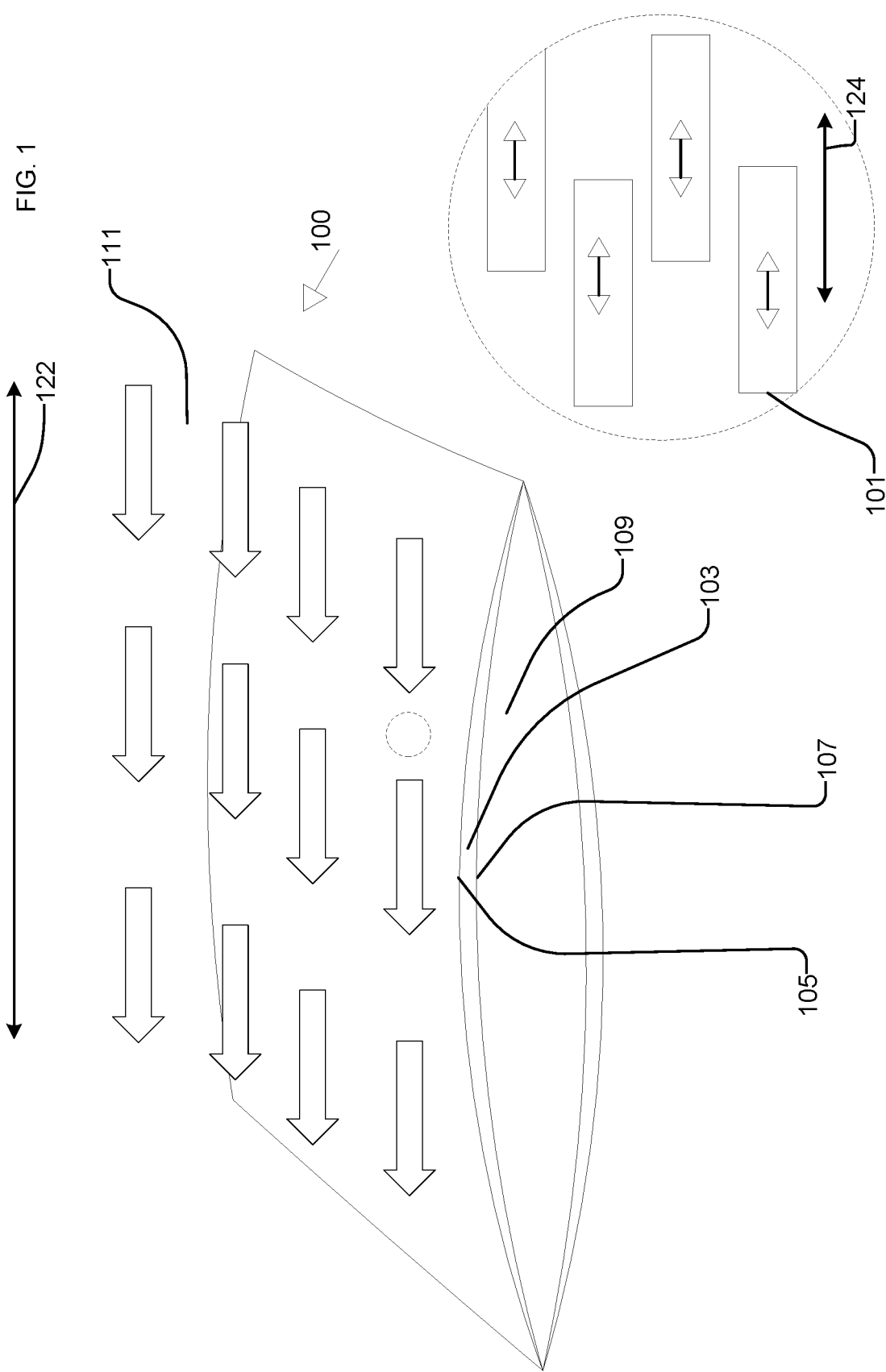
FIG. 1 is a schematic diagram of a fluid control system using separate movable sections according to an embodiment of the present disclosure.

Before turning to the figures, which illustrate the exemplary embodiments in detail, it should be understood that the present disclosure is not limited to the details or methodology set forth in the description or illustrated in the figures.

It should also be understood that the terminology used herein is for the purpose of description only and should not be regarded as limiting.

Referring generally to the figures, systems and methods described herein can be used to actively control drag on surfaces. Drag is a force acting opposite to the relative motion of any object moving with respect to a surrounding fluid. Drag manipulation technology has a wide range of applications for improving performance of systems that involve fluid flowing over a surface. For example, efficiency and speed can be increased in all manners of air transportation, including commercial aircraft, military aircraft, rockets, unmanned aerial vehicles, and general aviation. Reducing drag also increases efficiency in ground transportation such as in trains, cars, and tractor trailers. Water transportation, including maritime shipping, personal boating, and undersea transportation can similarly be benefited by reducing drag. Reducing drag can also boost efficiency when transporting fluids through pipes such as in natural gas or oil pipelines. Drag can be reduced to improve performance of pipes with flowing fluids, including jet engines, such as to reduce drag when accelerated air leaves an exit nozzle or exhaust of the pipes. Manipulating drag can be valuable across a wide range of Reynolds numbers, including relatively high Reynolds numbers experienced by maritime shipping through water and the relatively low Reynolds numbers experienced by unmanned aerial vehicles. Selectively increasing drag can also be useful for braking, steering, and other control of platforms. Being able to actively control surface drag of an object allows for not only the minimization of surface drag when efficiency or speed is most needed, but it can also allow for better steering and braking capabilities through selectively increasing surface drag.

Air, among other fluids, acts as a viscous fluid at subsonic speeds. An object moving through air may collect a group of air particles, which the object tends to pulls along as the object moves. Air particles close to the surface of the object tend to move with approximately the same velocity as the object due to viscous adhesion. As a flat plate, airfoil, or other object moves through a free stream of air at a given relative velocity, viscous adhesion causes a boundary layer of air having relative velocities below that of the relative free stream velocity to form adjacent to the object surface. The boundary layer can be a layer of air surrounding an object in which the relative velocity of the layer of molecules closest to the object is at or near zero, and in which the relative velocity at successively distant points from the object increases until it approaches that of the free stream, at which point the outer limit of the boundary layer is reached. For example, for an airfoil, the boundary layer can include the interface between the airfoil and the air mass surrounding the airfoil. The boundary layer may be relatively small as compared to a size dimension of the object. The difference between the free stream velocity and the relative velocities in the boundary layer region contribute to drag. Thus, increasing the relative velocities in the boundary layer region can reduce drag, and conversely, decreasing the relative velocities in the boundary layer region can increase drag. Drag may be caused by disturbances in flow, retarding flow near a surface. Such disturbances may not be damped as Reynolds number increases, which can lead to interactions that cause increasing disturbances, such as turbulent eddies. Disturbances may flow away from the surface into the outer boundary layer, which can cause continued disturbances. The present solution can control surface drag by controlling the difference between the velocity of the free stream and the relative velocities of the boundary layer, such as by interrupting the generation of disturbances near the surface.

Turbulent flow in boundary layers can contribute towards drag. A turbulent boundary layer can have a large number of eddies that transfer momentum from the faster moving outer portions of the boundary layer to the relatively slower portions closer to the surface. As such, turbulent boundary layers may have more surface friction than laminar boundary layers, which have more smooth flows, and are generally free from these eddies. Modifying turbulent eddies can make the boundary layer more laminar and so can be used to decrease drag. Modifying eddies can also change the nature of the turbulence to increase or decrease drag. The present solution can control surface friction and drag by modifying and/or controlling turbulent eddies in the boundary layer.

Systems and methods of the present solution can manipulate the boundary layer by creating deformations in the surface covering the body. This creates movement on the surface that is perpendicular to the flow of the fluid (e.g., spanwise motion). Systems and methods of the present solution can move separate sections of the surface in differing motions, such as a direction perpendicular to the flow, parallel to the flow of the fluid (e.g., streamwise motion), or various directions between perpendicular and parallel. Both spanwise and streamwise motion can agitate the air molecules at the boundary layer.

Both spanwise and streamwise motion, or some combination of the two, can create one or more surface waves (mechanical waves that propagate along the interface between the deformable surface and the fluid) that can manipulate the boundary layer in one or more directions. The surface waves can be simple surface waves such as sinusoidal waves or may be any other type of waves, including but not limited to superposition of sinusoids. Further, the waveform of the surface waves may be aperiodic or damped, or may comprise numerous surface displacements or deformations. Any of a variety of signal processing and analysis techniques may be applied in order to generate the desired waveforms, including but not limited to Fourier transforms, fast Fourier transforms (FFTs), wavelet transforms, and the like.

As compared to existing systems, which may rely on providing an aerodynamic shape of a body rather than manipulating the boundary layer of a fluid and may not allow for real-time control of surface manipulation to control surface drag, the present solution can actively create deformations on a surface surrounding a body and/or actively move separate sections of a surface surrounding a body. As such, the present solution can enable more adaptable and controllable boundary layer manipulation, surface wave generation, and surface drag modification.

Although many of the concepts disclosed herein may be described with reference to air as being the fluid medium, the present solution can enable active control of surface drag of any of a variety of fluids.

A. Systems and Methods for Active Control of Surface Drag Using Surface Oscillation Referring generally to FIGS. 1-8, a fluid control system is shown that can be used to actively control surface drag of a surface by generating oscillations of the surface, such as by causing portions of the surface to move within a plane of the surface or out of the plane of the surface. In some embodiments, the fluid control system includes a surface covering a body in at least a first and second direction. The first direction is orthogonal to the second direction. The surface includes a bottom side facing the body and a top side opposite the bottom side. The fluid control system includes one or more movable sections on the top side of the surface, such as a plurality of separate movable sections. The movable sections can be configured to modify a boundary layer of a fluid flowing over the surface by moving the at least one movable section along the top side of the surface. The fluid control system can selectively control surface drag over the surface by selectively moving the at least one separate movable section.

Figure 2:
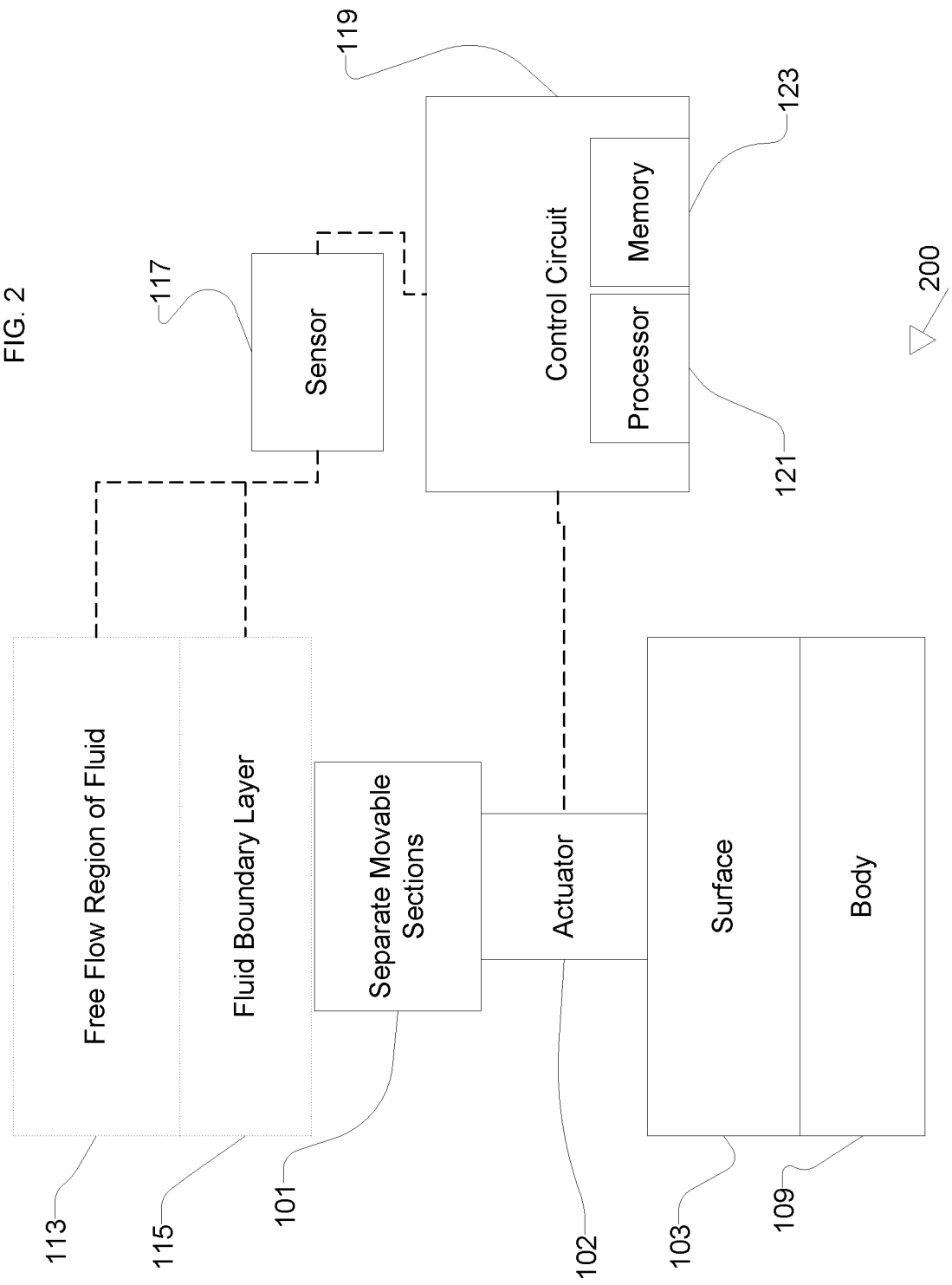
FIG. 2 is a block diagram of a fluid control system using separate movable sections according to an embodiment of the present disclosure.

Referring now to FIGS. 1-2, a fluid control system 100 using at least one separate movable section 101 is depicted. The surface 103 covers a body 109 in a first and second direction. The surface 103 has a bottom 107 that faces the body and a top 105 that is opposite the bottom side. The fluid 111 flows in a streamwise direction 122 over the top 105 of the surface 103, which can be at various angles relative to a spanwise direction 124, including but not limited to perpendicular to the spanwise direction 124. The surface 103 can include or define various movable sections 101, which may be connected with or spaced from one another.

The fluid control system 100 can be similar to the fluid control system 1000 described further herein, except that the fluid control system 100 modifies the fluid boundary layer 115 by moving the at least one movable section 101, rather than causing deformers to deform the surface 103 into and out of the plane of the surface 103. The fluid control system 100 can move the at least one movable section 101 parallel to (e.g., in-plane with) the plane of the surface 103 (e.g., in the spanwise direction 124), or into and out of the plane of the surface 103. The streamwise or spanwise movement of the movable section(s) 101 can generate surface waves and oscillations, which can modify the fluid boundary layer 115. In some embodiments, such as depicted in FIG. 1, a plurality of separate movable sections 101 are positioned along the surface 103 with gaps in between the separate movable sections 101. In some embodiments, at least some of the movable sections 101 may be continuous or otherwise connected with one another (e.g., rather than having gaps in between), while being driven by actuators 102 as described below in various directions.

In some embodiments, a first movable section 101 moves relative to a second movable section 101. For example, the first and second movable sections 101 may each be connected to actuators 102, which can drive the first and second movable sections 101 in opposing directions (e.g., opposing directions along streamwise direction 122 or spanwise direction 124). In some embodiments, the first movable section 101 is fixed, while the second movable section 101 moves relative to the fixed first movable section 101. The actuators 102 can cause the at least one movable section 101 to move in the plane of the surface 103 or out of the plane of the surface 103.

In various embodiments, the first movable section 101 may be coupled to the second movable section 101. For example, the movable sections 101 may be coupled by a fixed member. The movable sections 101 may be coupled by a spring member, which can facilitate surface wave generation by transmitting and/or damping movement forces amongst movable sections 101.

The movable sections 101 can vary in width. For example, widths of the movable sections 101 can be selected based on local flow conditions, such as to correlate the widths of the movable sections 101 to a parameter associated with local flow conditions. The parameter may include at least one of a Reynolds number, average flow rate, or boundary layer thickness of the fluid 111. As such, the surfaces waves generated by the movable sections 101 can be targeted to break up disturbances of the fluid 111, such as turbulent eddies, having specific dimensions.

Referring further to FIG. 2, the fluid control system 100 includes a sensor 117. The sensor 117 can detect a parameter of the fluid 111, such as a parameter of the fluid 111 at the fluid boundary layer 115. In some embodiments, the sensor 117 can detect parameters (e.g., in cooperation with control circuit 119) such as friction velocity, surface shear stress, viscosity, pressure, temperature, or various parameters indicative of turbulence of the fluid 111.

The fluid control system 100 includes a control circuit 119. The control circuit 119 includes a processor 121 and memory 123. The control circuit 119 can control operation of the actuator(s) 102 and the movable section(s) 101 in order to move the at least one movable section(s) 101 and generate a surface wave to actively control surface drag associated with the fluid boundary layer 115. For example, the control circuit 119 can generate a control signal based on a parameter detected by sensor 117. The control circuit 119 can transmit the control signal to the actuator(s) 102 to move the movable section(s) 101 to create surface waves. The control circuit 119 generates a control signal that specifies the relative speeds at which the actuator(s) 102 are to move the movable section(s) 101. In some embodiments, the control signal specifies the frequency of movement, the duration of movement, or the position that the movable section(s) 101 are moved to on the surface 103. The control circuit 119 can generate the control signal to cause the movable sections 101 to move in a manner to achieve a desired surface wave and/or modification to surface drag of the fluid 111. The control circuit 119 can generate the control signal to indicate an amplitude of movement of the moveable section(s) 101. The control circuit 119 can generate the control signal to indicate a frequency of movement of one or more movable section(s) 101 relative to one another. The control circuit 119 can generate the control signal to indicate a phase of movement of each of the movable section(s) 101. The control circuit 119 can generate the control signal to indicate an effective wavelength corresponding to a spatial distance along which the movable section(s) 101 move in the plane of the surface 103. The control circuit 119 can generate the control signal to indicate multiple movable sections 101 that are to move together (e.g., in gangs or groups such that a position of each movable section 101 of the group is the same or the same relative to a zero or baseline position).

Figure 3:
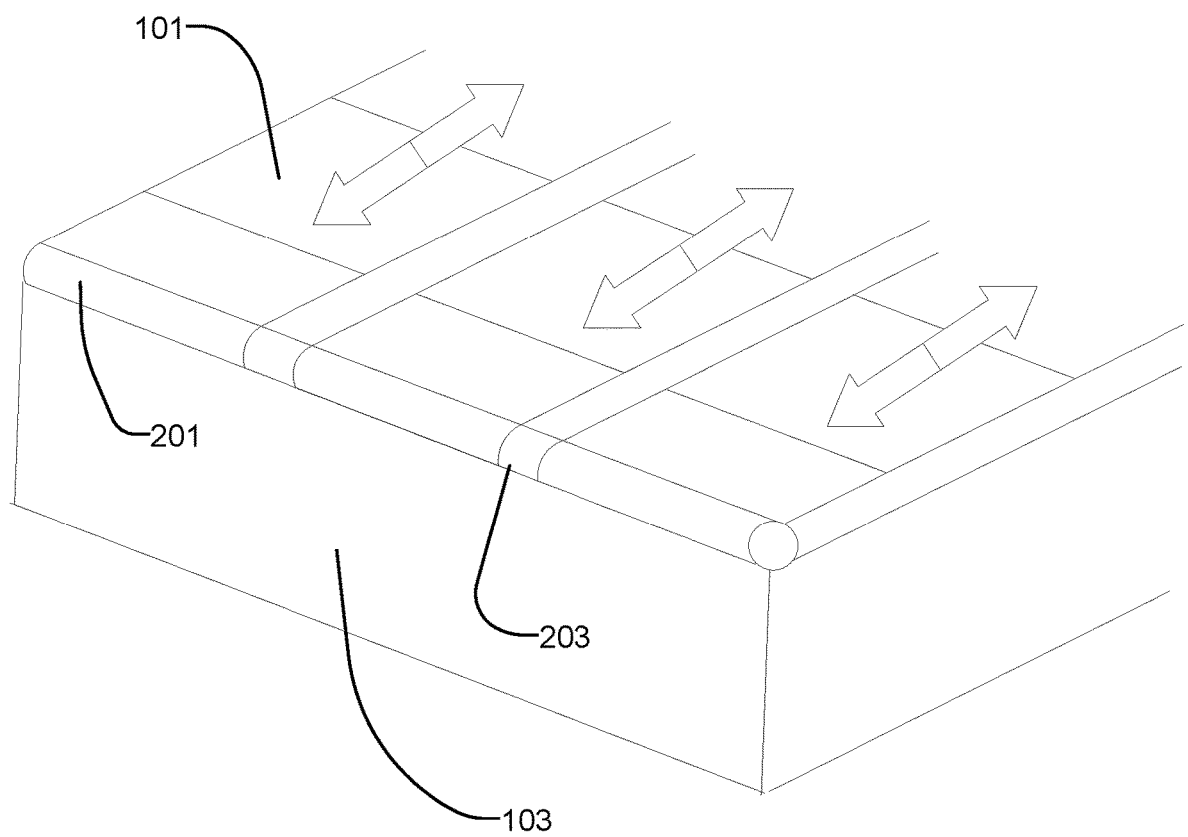
FIG. 3 is a schematic diagram of a fluid control system using separate movable sections moved by belts according to an embodiment of the present disclosure.

Referring now to FIG. 3, in some embodiments, the at least one actuator 102 can include at least one belt 201 that moves the movable section(s) 101 across the surface 103. In some embodiments, between each belt 201 is a gap 203. The at least one belt 201 can move the movable sections 101 in opposing directions. The at least one belt 201 can move the movable section(s) 101 at different velocities to obtain a discrete wave of speeds across the surface. In some embodiments, each movable section 101 is moved independently and out of phase from one another to generate a standing wave. The at least one belt 201 can move the movable section(s) 101 in a sinusoidal or other periodic motion.

Figure 4:
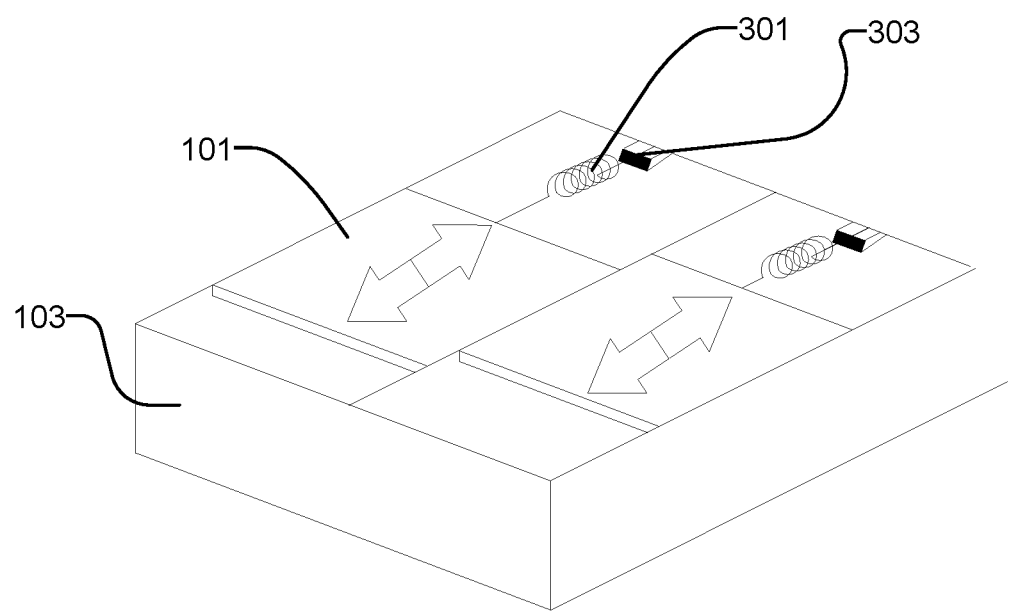
FIG. 4 is a schematic diagram of a fluid control system using separate movable sections moved by springs according to an embodiment of the present disclosure.

Referring now to FIG. 4, one or more springs 301 can be attached to the movable section(s) 101. The at least one actuator can include at least one spring actuator 303 that compresses and releases the spring(s) 301 to move the movable section(s) 101 across the surface 103 in a streamwise or spanwise direction. The at least one spring actuator 303 can include various actuators such as piezoelectric actuators, pneumatic actuators, or actuators that are self-actuated by the fluid flow. The at least one spring actuator 303 can drive the spring(s) 301 at a resonant frequency, such as to enable fully resonant oscillation of the spring(s) 301. The separate movable section(s) 101 can oscillate after the spring(s) 301 are released by the at least one spring actuator 303. This oscillatory motion can contribute to creating a surface wave to modify the boundary layer of the fluid flowing over the surface 103. In some embodiments, there is a gap between the movable sections 101. As noted above, the movable sections 101 can vary in width, so as to optimize drag reduction along the width or length of the surface 103.

Figure 5:
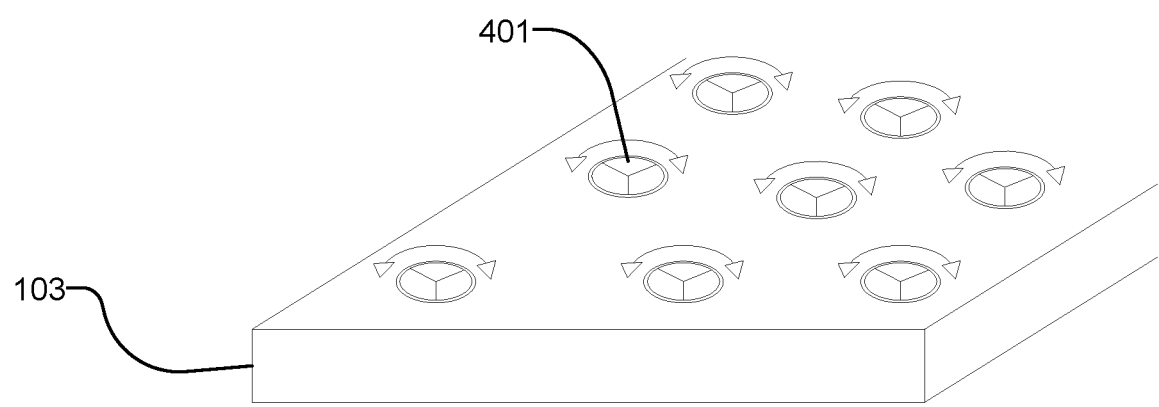
FIG. 5 is a schematic diagram of a fluid control system using rotating disks as separate movable sections according to an embodiment of the present disclosure.

Referring now to FIG. 5, the surface 103 can include disc shaped movable sections 401, which can rotate or oscillate in either direction about an axis perpendicular to the surface 103 to modify the boundary layer of the fluid. In some embodiments, each movable section 401 is rotated at a unique angular velocity. The movable sections 401 can be positioned on the surface 103 to generate surface waves when rotated or oscillated at desired angular velocities.

Figure 6:
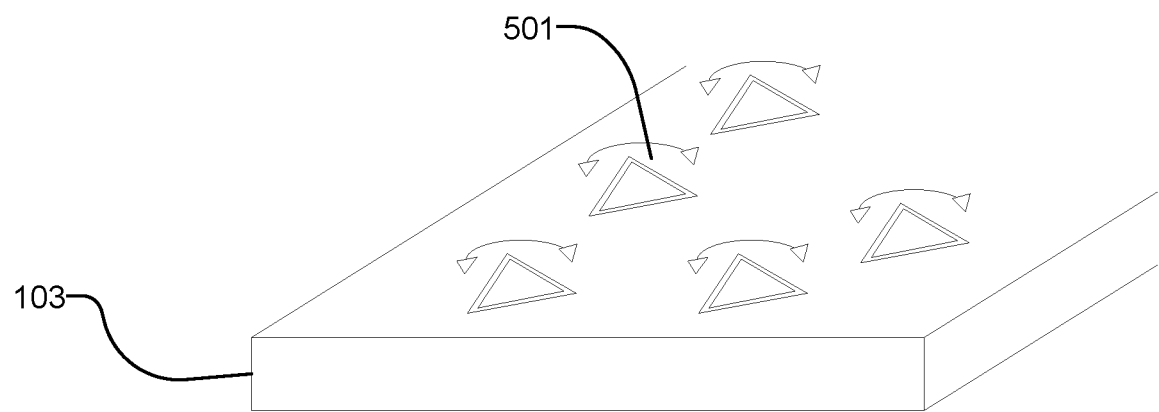
FIG. 6 is a schematic diagram of a fluid control system using rotating triangularly shaped disks as separate movable sections according to an embodiment of the present disclosure.

Referring now to FIG. 6, in some embodiments, the surface 103 can include movable section(s) 501. The movable sections 501 are triangularly shaped with the long axis of the triangle aligned in a streamwise direction. The movable sections 501 are shaped and can oscillate in a spanwise direction in a way that optimizes drag reduction along the streamwise length of the surface 103. The movable sections 501 may oscillate a relatively small amount (e.g., less than a threshold angle of rotation, the threshold angle being less than or equal to thirty degrees, less than or equal to fifteen degrees, less than or equal to five degrees).

Figure 7:
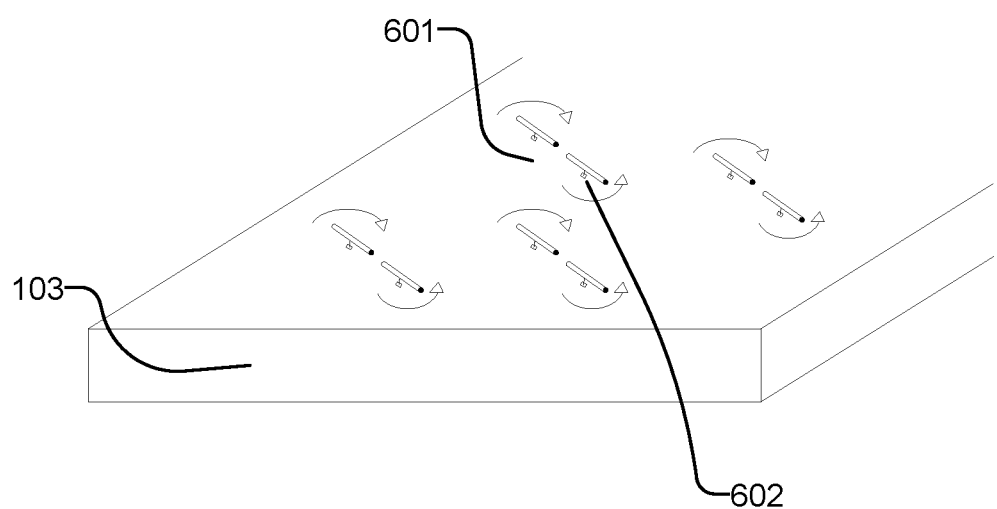
FIG. 7 is a schematic diagram of a fluid control system using interlocking movable sections according to an embodiment of the present disclosure.

Referring now to FIG. 7, in some embodiments, the movable sections 101 are interlocking. For example, as shown in FIG. 7, a first movable section 101 can include a first extension 601 that at least partially extends adjacent to a second extension 602 of a second movable section 101. In some embodiments, a gap (not shown) may be provided between movable sections 101 and thus extensions 601, 602. The gap may be minimally small, which can minimize flutter and drag between the sections 101.

Figure 8:
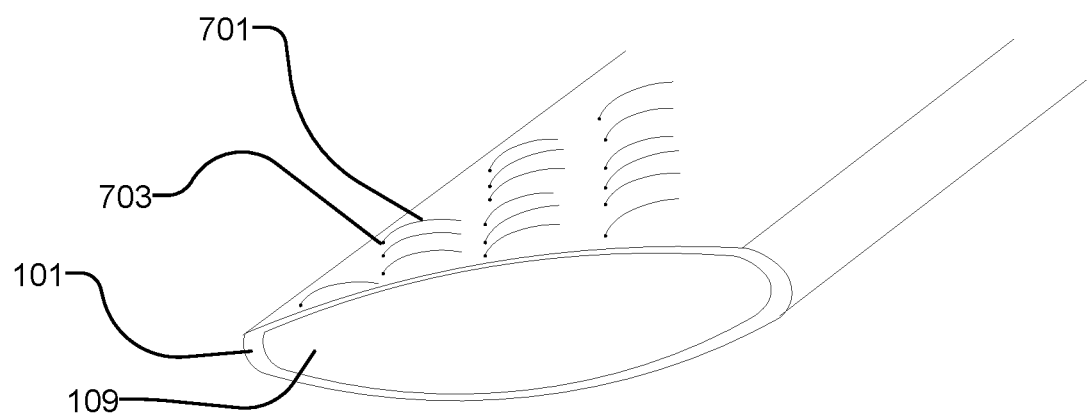
FIG. 8 is a schematic diagram of a fluid control system using a plurality of wires as separate movable sections according to an embodiment of the present disclosure.

Referring now to FIG. 8, in some embodiments, the movable sections 101 include one or more wires 701 that are anchored to the surface 103 by at least one end 703. The wires 701 move through and modify the boundary layer 115 of the fluid. In some embodiments, the flow of the fluid over the body 109 generates movement of the wires 701 that modifies the boundary layer of the fluid. In some embodiments, movement of the body 109 generates the movement of the wires 701. The positions of the anchored ends 703 can be selected to maximize the boundary layer modification by the movement of the wires 701, based on factors such as wire length, wire spacing, and wire rigidity.

Figure 9:
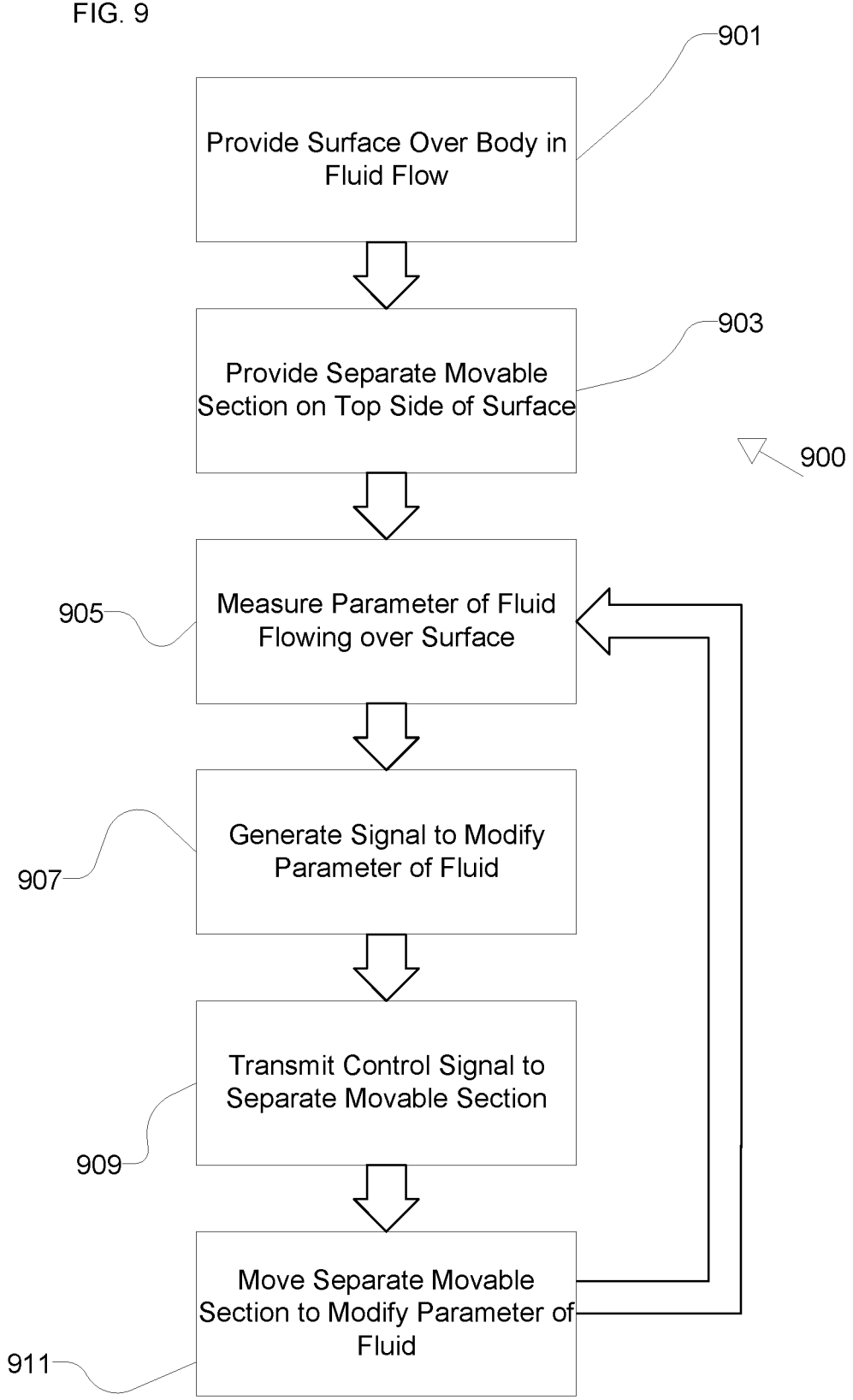
FIG. 9 is a flow diagram of a method for active control of surface drag according to an embodiment of the present disclosure.

Referring now to FIG. 9, a method 900 of active control of surface drag is depicted. The method 900 can be performed using the fluid control system 100. At 901, a surface is provided over a body in fluid flow. The surface covers the body in at least two orthogonal directions and includes a bottom side facing the body and a top side opposite the bottom side.

At 903, a movable section is provided. The movable section can move streamwise across the surface. The movable section can move out of a plane of the surface. A plurality of movable sections can be provided, which may have intermittent gaps. The movable sections can include belts, rotatable disks, or other components which can move across the deformable surface.

At 905, a parameter of the fluid flowing over the deformable surface is measured. The parameter may include any of a variety of parameters such as friction velocity, surface shear stress, viscosity, pressure, temperature, or various parameters indicative of turbulence.

At 907, a control signal to modify the measured parameter is generated based on the measured parameter by a control circuit. For example, the control circuit can generate the control signal to modify operation of the movable sections to achieve a target surface drag, fluid flow velocity, vehicle speed, vehicle fuel burn, or other parameter related to the surface drag of the fluid flowing over the deformable surface.

At 909, the control signal is transmitted to the movable section (e.g., to an actuator coupled with the movable section that controls movement of the movable section). Based on the control signal, at 911 the movable section moves to modify the parameter of the fluid. For example, the movable section can move in a manner intended to modify a surface drag of the fluid as the fluid flows over the body.

As shown in FIG. 9, the control circuit can execute a control loop by iteratively measuring the parameter of the fluid flowing over the surface, and updating the control signal at each iteration to achieve a desired value of the measured parameter. For example, a sensor may measure the fluid flow velocity at various points in the boundary layer. The sensor will transmit the measurement to the control circuit, which will compare it to the desired fluid flow velocity at the boundary layer. If the measured fluid flow velocity is lower than the desired fluid flow velocity, then the control circuit will generate a control signal that will result in the separate movable sections moving to increase the fluid flow velocity. If the measured fluid flow velocity is higher than the desired fluid flow velocity, then the control circuit will generate a control signal that will result in the movable sections moving to decrease the fluid flow velocity. After the control signal is transmitted to the movable section, the sensor measures the fluid flow velocity at the boundary layer again and the feedback loop is continued. In some embodiments, the sensor will measure the velocity of the body through the fluid and transmit the measurement to the control circuit, which will compare it to the desired velocity of the body. If the velocity of the body is lower than the desired velocity, the control circuit will generate a control signal that will result in the separate movable sections moving to increase the velocity of the body by decreasing surface drag. If the velocity of the body is higher than the desired velocity, the control circuit will generate a control signal that will result in the separate movable sections moving to decrease the velocity of the body by increasing surface drag. After the control signal is followed, the sensor measures the velocity of the body again and the feedback loop is continued.

B. Systems and Methods for Active Control of Surface Drag Using Surface Deformation Referring generally to FIGS. 10-17, a fluid control system is shown that can be used to actively control surface drag of a surface by deforming the surface, in contrast to the movable section motions described with reference to FIGS. 1-9. For example, the fluid control system can cause the surface to move in a direction out of an initial plane at which the surface (or a portion thereof) is located, such as a direction perpendicular to the initial plane, or can cause the surface to move in the initial plane. In some embodiments, the fluid control system includes a deformable surface that covers a body in at least a first and second direction. The first direction is orthogonal to the second direction. The deformable surface includes a bottom side that faces the body and a top side that is opposite the bottom side. The fluid control system also includes at least one deformer between the deformable surface and the body. The at least one deformer is configured to modify a boundary layer of a fluid that is flowing over the deformable surface by selectively deforming the top side of the surface. The fluid control system can selectively control surface drag over the deformable surface by selectively deforming the top side of the surface.

Figure 10:
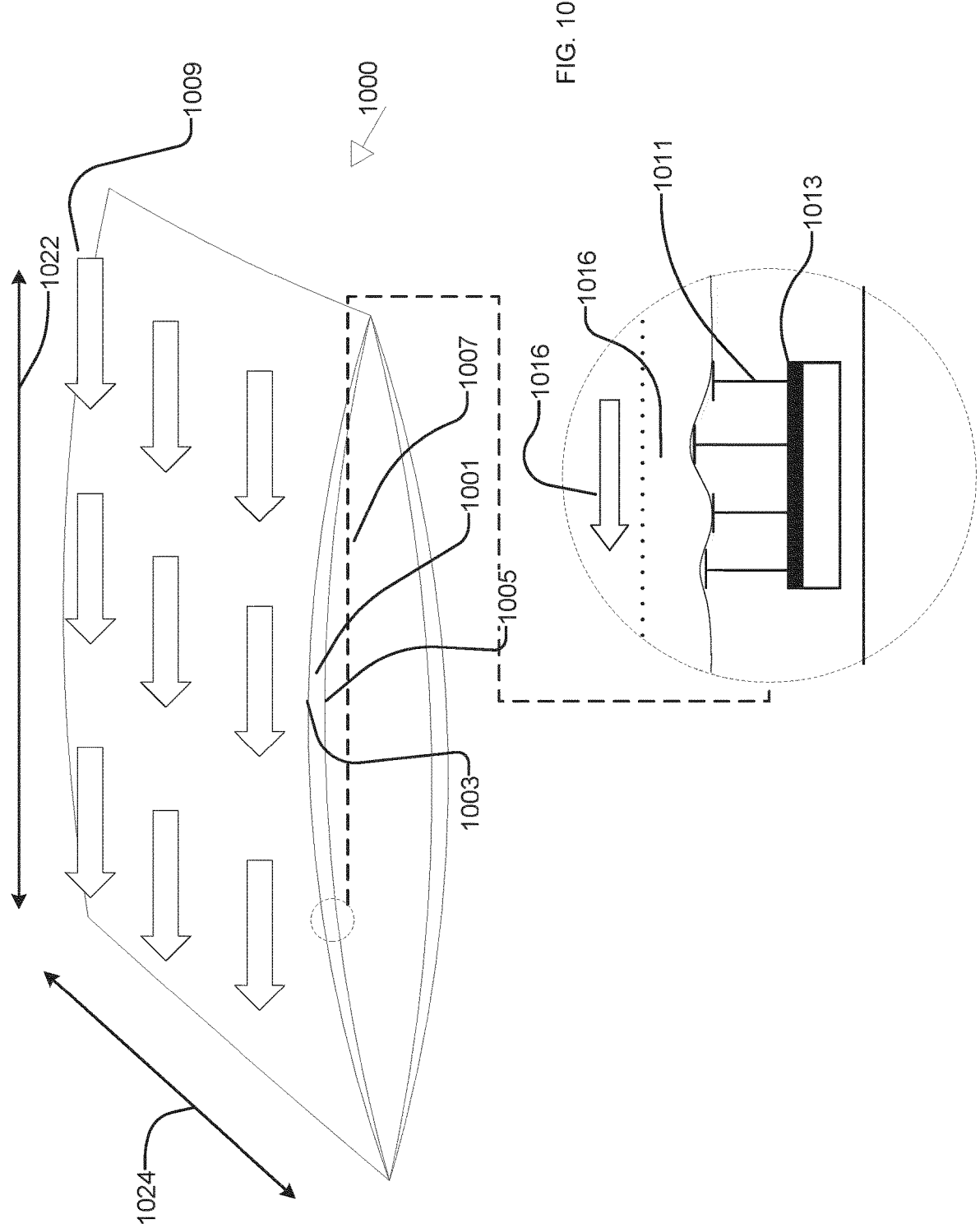
FIG. 10 is a schematic diagram of a fluid control system using a deformable surface according to an embodiment of the present disclosure.
Figure 11:
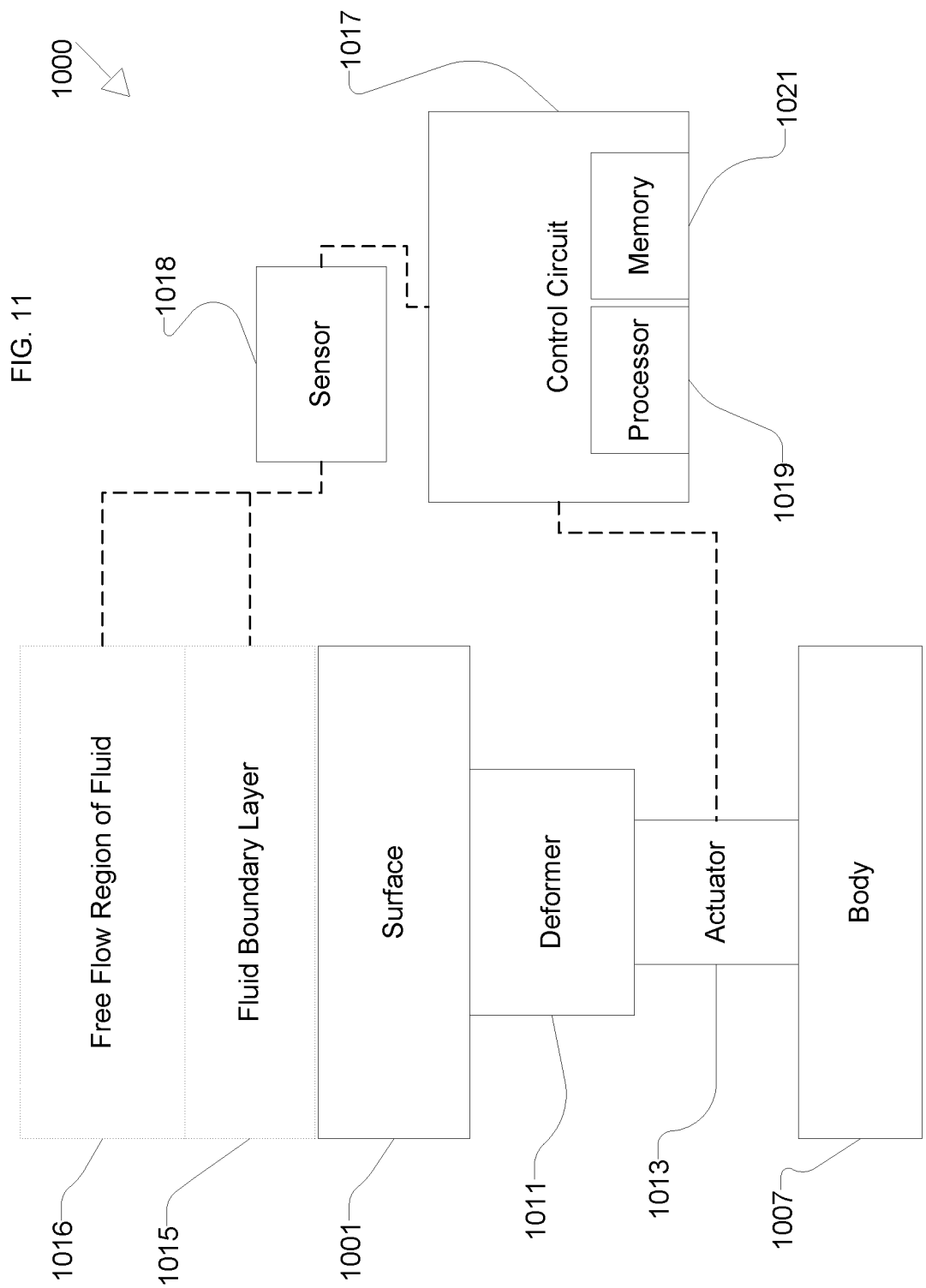
FIG. 11 is a block diagram of a fluid control system using a deformable surface according to an embodiment of the present disclosure.

Referring now to FIGS. 10-11, a fluid control system 1000 using a deformable surface 1001 is depicted. The deformable surface 1001 covers a body 1007 in a first and second direction. The deformable surface 1001 has a bottom side 1005 that faces the body 1007 and a top side 1003 that is opposite the bottom side 1005. The body 1007 can be in the shape of an airfoil. The body 1007 can be or form part of devices such as wind turbines and propellers.

In some embodiments, the body 1007 includes the wing, tail section, fuselage or any other part or combination of parts of a rocket, commercial aircraft, military aircraft, unmanned aerial vehicle, or any other air transportation platform. In some embodiments, the body 1007 is the outer hull or any other part or combination of parts of a submarine, submersible, boat, ship, barge, personal watercraft, waterski or any other water transportation platform. In some embodiments, the body 1007 is the frame or any other part or combination of parts of a of a tractor trailer, truck, tractor trailer, car, motorcycle, tractor, lawnmower, motorized scooter, bicycle or any other ground transportation platform.

The fluid control system 1000 includes one or more deformers 1011 that are configured to deform the top side 1003 of the deformable surface 1001. By deforming the top side 1003 of the deformable surface 1001, the deformers 1011 can actively control surface drag over the deformable surface 1001. The deformers 1011 can generate deformations on the surface perpendicular to the flow of a fluid 1009. The fluid 1009 can be air, water, or any other fluid which may flow over the deformable surface 1001. As shown in FIG. 10, the flow 1009 flows in a streamwise direction 1022 perpendicular to a spanwise direction 1024. By moving the deformable surface 1001 into and out of an initial plane in which the deformable surface 1001 (or a portion thereof) was located, or at least partially within the initial plane, the deformers 1011 can change the velocity of the fluid 1009 at a boundary layer 1015.

The deformers 1011 can selectively deform the top side 1003 of the deformable surface 1001, which can modify the boundary layer 1015 of the fluid 1009 that is flowing across the deformable surface 1001. The deformers 1011 can individually deform the deformable surface at specific locations, allowing for control over the placement of deformations across the top side 1003 of the deformable surface 1001. In some embodiments, the deformers 1011 can control one or more of the frequency, amplitude, duration, and intermittency of the deformations on the deformable surface 1001 to cause an expected surface wave of the fluid 1009 to achieve a desired change in the surface drag of the fluid 1009 flowing across the deformable surface 1001.

In some embodiments, one or more actuators 1013 controls the one or more deformers 1011. In some embodiments each actuator 1013 controls a corresponding deformer 1011. In some embodiments at least one actuator 1013 controls more than one deformer 1011. The one or more actuators 1013 can be powered by an external power source, battery, solar energy, internal combustion engine or any other power source. For example, the control circuit 1017 discussed below can output a control signal to cause the power source to deliver a desired current and/or desired voltage to the one or more actuators 1013 to cause the one or more actuators 1013 to move.

The deformers 1011 can create surface waves to modify turbulence of the boundary layer 1015. The fluid 1009 in the boundary layer 1015 will have a velocity profile with velocities that are less than a velocity in the free flow region 1016 of the fluid 1009. The deformers 1011 can generate selective deformations at specific locations on the deformable surface 1001 and at specific times to generate spanwise motion, which can create one or more surface waves, which can modify the relative velocities of the fluid 1009 at the boundary layer 1015 and/or the amount of turbulent flow in the boundary layer 1015. The controlled modification of the boundary layer 1015 by the deformers 1011 can allow for a measure of control over the surface drag the body 1007 experiences when travelling through the fluid 1009.

In some embodiments, the deformable surface 1001 includes at least one of an elastomeric material, a thin film material, silicon nitrite, graphite, or a long chain polymer. The material of the deformable surface 1001 may be chosen to enhance the aerodynamic properties of the deformable surface 1001. The material of the deformable surface 1001 may be chosen to achieve a proper interface between the boundary layer 1015 and the body 1007 that is most conducive to active control of surface drag.

In some embodiments the deformable surface 1001 includes a flexible material and is configured to be stretched over bodies of different shapes. This allows for the deformable surface 1001 to be manufactured to work with several different bodies. For instance, the deformable surface 1001 can be configured to fit onto airplane wings of different models but that all have similar sizes. The deformable surface 1001 can be adjusted slightly when placed onto each body 1007. The deformers 1011 can be located in certain positions with respect to the expected fluid flow direction to enable desired active control of surface drag.

Referring further to FIG. 11, the fluid control system 1000 includes a sensor 1018. The sensor 1018 can be similar to the sensor 117 of the fluid control system 100. The sensor 1018 can detect at least one parameter of the fluid 1009 surrounding the deformable surface 101, which is covering the body 1007 in a first and second direction. The sensor 1018 can include a flow meter to detect a velocity of fluid 1009 of the fluid boundary layer 1015. The sensor 1018 can include a flow meter detect a velocity of the fluid 1009 of the free flow region 1016.

In some embodiments, the sensor 1018 detects a parameter associated with the body 1007, or a platform that includes the body 1007. For example, the sensor 1018 can include a position sensor that detects at least one of a position or an orientation of the body 1007, such as an accelerometer, a gyroscope, a GPS/GNSS sensor, or an inertial navigation system. The sensor 1018 can include a pressure sensor. The sensor 1018 can include a temperature sensor. In some embodiments, the sensor 1018 detects a parameter associated with a fuel level of a platform that includes the body 1007, which can be used (by control circuit 1017 described below) to determine a fuel burn rate of the platform.

The fluid control system 1000 includes a control circuit 1017, in some embodiments. Similar to the control circuit 119 of the fluid control system 100, the control circuit 1017 can include a processor 1019 and memory 1021. The processor 1019 can be a general purpose or specific purpose processor, an application specific integrated circuit (ASIC), one or more field programmable gate arrays (FPGAs), a group of processing components, or other suitable processing components. The processor 1019 is configured to execute computer code or instructions stored in memory 1021 or received from other computer readable media (e.g., CDROM, network storage, a remote server, etc.). Memory 1021 can include one or more devices (e.g., memory units, memory devices, storage devices, etc.) for storing data and/or computer code for completing and/or facilitating the various processes described in the present disclosure. Memory 1021 can include random access memory (RAM), read-only memory (ROM), hard drive storage, temporary storage, non-volatile memory, flash memory, optical memory, or any other suitable memory for storing software objects and/or computer instructions. Memory 1021 can include database components, object code components, script components, or any other type of information structure for supporting the various activities and information structures described in the present disclosure. Memory 1021 can be communicably connected to processor 1019 via control circuit 1017 and may include computer code for executing (e.g., by processor 1019) one or more processes described herein. When processor 1019 executes instructions stored in memory 1021, processor 1019 generally configures the control circuit 1017 to complete such activities.

The sensor 1018 sends detected parameters to the control circuit 1017. The control circuit 1017 generates a control signal based on the parameter(s) received from the sensor 1018. The control circuit 1017 may generate the control signal by implementing any of a variety or combination of applicable control algorithms, including but not limited to intelligent algorithms (artificial intelligence, fuzzy control, neural networks, genetic algorithms, stochastic optimization based control, etc.), lookup tables, traditional controllers (classical controllers, multivariable controllers, optimal controllers, etc.), etc. The control circuit 1017 can calculate a surface drag of the fluid 1009 flowing over the deformable surface 1001 based on the received parameters, such as based on velocity and/or pressure information.

The control circuit transmits the control signal to the actuator 1013, which moves the deformers 1011 to create a deformation in the deformable surface 1001. This deformation can modify the fluid boundary layer 1015, which can result in a modification of the surface drag on the body 1007.

In some embodiments, the control circuit 1017 generates the control signal by determining a desired characteristic of a surface wave to be generated by operation of the deformers 1011, and executes a control function that translates the desired characteristic into information to control operation of the actuator(s) 1013. For example, the control circuit 1017 can generate the control signal to indicate at least one of an amplitude, frequency, or intermittency of motion of each of the deformers 1011 based on the desired characteristic of the surface wave. The control circuit 1017 can similarly generate the control signal based on a desired surface drag of the fluid 1009, velocity of the fluid 1009, flow rate of the fluid 1009, or other parameter associated with the body 1007, deformable surface 1001, and/or fluid 1009.

In some embodiments, the control circuit 1017 generates the control signal based on a parameter detected by the sensor 1018. For example, the control circuit 1017 can receive a parameter such as speed, fuel level, or other parameter associated with operation of a platform that includes the body 1007, compare the received parameter to a target value of the parameter, and modify the control signal to reduce a difference between the received parameter and the target value of the parameter. Similarly, the control circuit 1017 can generate the control signal to achieve a target value of surface drag, flow rate of fluid 1009, or other parameters that may be measured by sensor 1018 and/or calculated based on parameters measured by sensor 1018.

Figure 12:
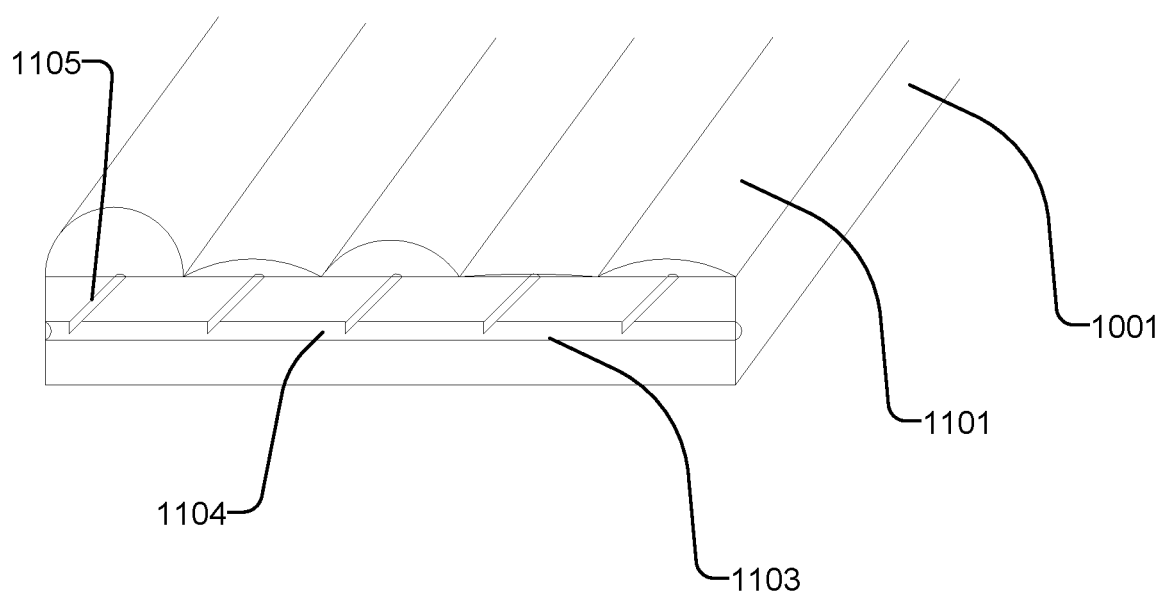
FIG. 12 is a schematic diagram of a fluid control system using a deformable surface and fluid channel deformers according to an embodiment of the present disclosure.

Referring now to FIG. 12, in some embodiments, the fluid control system 1000 deforms the deformable surface 1001 by selectively moving a fluid 1104 relative to the deformable surface 1001. As shown in FIG. 2, the at least one deformer 1011 include at least one fluid channel 1103. The at least one fluid channel 1103 can be coupled to a plurality of cavities 1101 through couplings 1105. The fluid 1104 may be transferred between fluid channel 1103 and one or more cavities 1101 through couplings 1105, thereby increasing or decreasing the volume of cavities 1101. The increase or decrease of volume of the cavities 1101 may create deformations to the deformable surface 1001. In some embodiments, the deformable surface 1001 can be the surface of the cavities 1101. In some embodiments, the deformable surface 1001 can be a flexible material stretched over the cavities 1101. The fluid 1104 that is transferred between the cavities 1101 and the fluid channel 1103 may be a gas, a liquid, a viscous gel-like fluid, or any other fluid. The cavities 1101 may be positioned to induce surface waves when the fluid 1104 is transferred between the cavities 1101 and the fluid channel 1103. The actuators 1013 can include pumps to drive the fluid 1104 through the fluid channels 1103.

Figure 13:
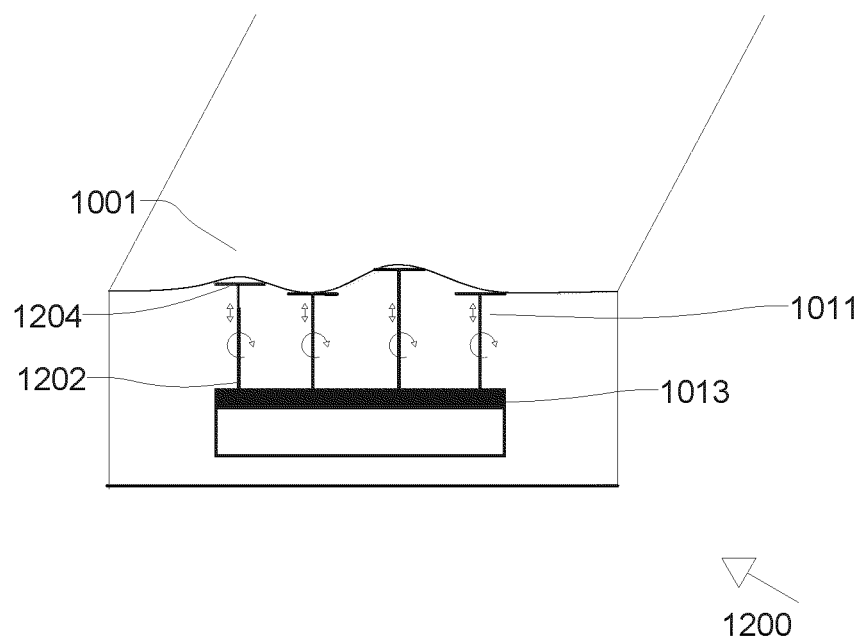
FIG. 13 is a schematic diagram of a fluid control system according to an embodiment of the present disclosure.

Referring now to FIG. 13, in some embodiments, the fluid control system 1000 includes one or more deformers 1011 that are shaped as T-bars. For example, the one or more deformers 1011 can include a first member 1202 coupled to one or more corresponding actuators 1013, and a second member 1204 coupled to the first member 1202 and to the deformable surface 1001. The at least one actuator 1013 can apply torque against the deformable surface 1001 at various controlled locations by rotating the one or more deformers 1011, resulting in deformations to the deformable surface 1001. The actuator 1013 can rotate the T-bar deformers 1011 around an axis perpendicular to the surface (e.g., around spanwise axis 1024). The locations on the deformable surface 1001 that the deformer 1011 applies force against can be selected so that surface waves are generated by the deformations. The second member 1204 can deform as the deformable surface 1201 deforms when the one or more deformers 1011 rotate.

Figure 14:
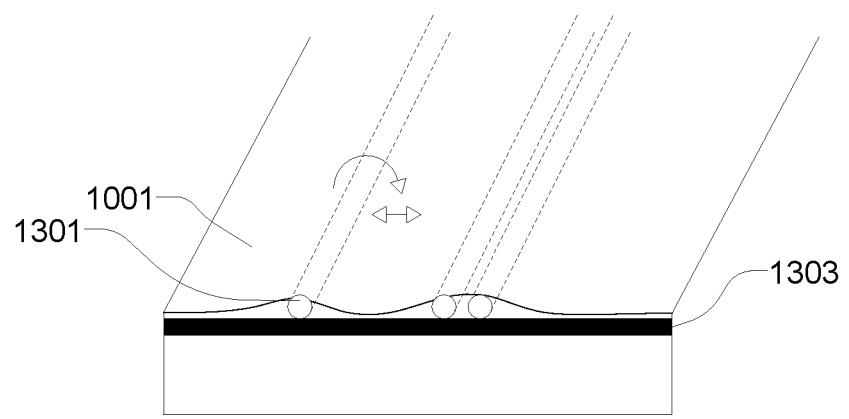
FIG. 14 is a schematic diagram of a fluid control system using a deformable surface and rod deformers according to an embodiment of the present disclosure.

Referring now to FIG. 14, in some embodiments, at least one actuator 1013 includes a rod actuator 1303 that can rotate one or more rods 1301 about an axis parallel to the deformable surface 1001. For example, as shown in FIG. 14, the rods 1301 can be moved in the streamwise direction 1022 relative to one another. The movement of the rods 1301 can create deformations on the deformable surface 1001. The movement of the rods 1301 can also move deformations across the deformable surface 1001.

Figure 15:
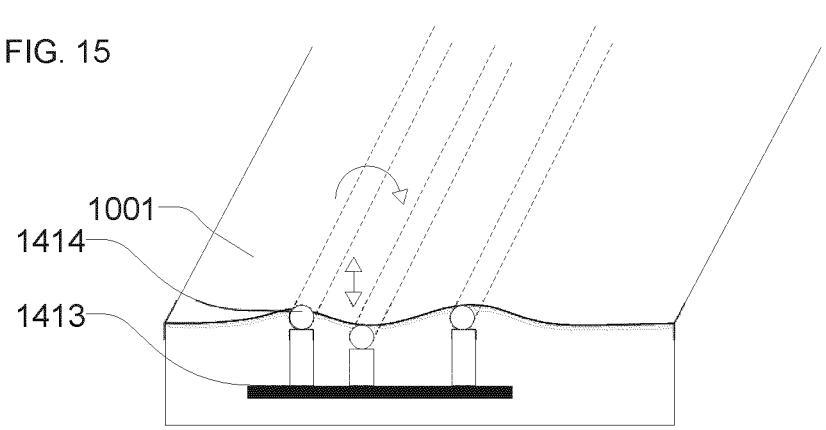
FIG. 15 is a schematic diagram of a fluid control system using a deformable surface and rod deformers according to an embodiment of the present disclosure.

Referring now to FIG. 15, in some embodiments, at least one actuator 1013 includes a rod actuator 1413 that can rotate one or more rods 1411 about an axis parallel to the deformable surface 1001. The rod actuator 1413 can also move the rods 1411 in a direction perpendicular to the deformable surface 1001. The movement of the rods 1411 can create deformations on the deformable surface 1001.

Figure 16:
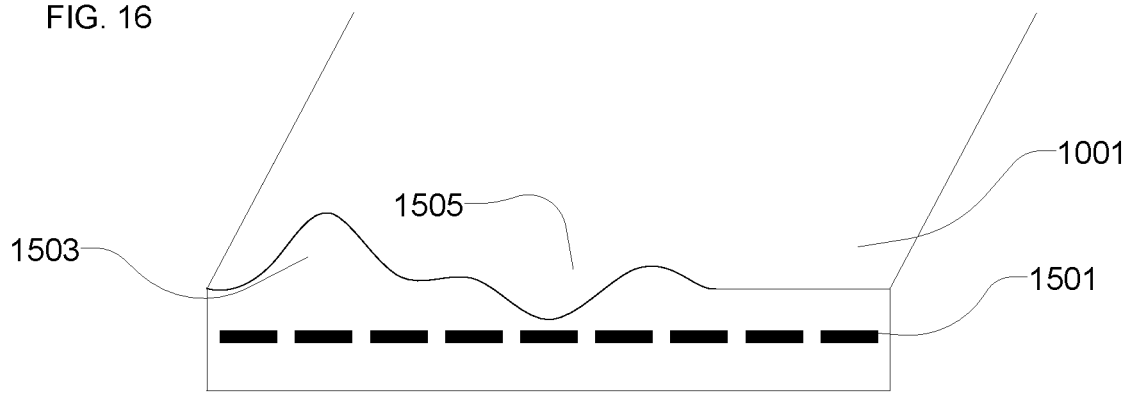
FIG. 16 is a schematic diagram of a fluid control system using a deformable surface and electromagnetic deformers according to an embodiment of the present disclosure.

Referring now to FIG. 16, at least one actuator 1013 includes one or more electromagnetic deformers 1501, in some embodiments. The one or more electromagnetic deformers 1501 can selectively generate one or more electromagnetic impulses (e.g., time-varying electromagnetic fields) at controlled locations. In various such embodiments, the deformable surface 1001 responds to electromagnetic impulses and can either be attracted to the electromagnetic impulses, as a region 1505, or repelled by the electromagnetic impulses, as at region 1503. The reaction by the deformable surface 1001 to the electromagnetic impulses created by the electromagnetic deformer 1501 creates deformations on the deformable surface 1001. The electromagnetic deformers 1501 can modulate at least one of a frequency or a magnitude of the electromagnetic impulses to selectively move the deformable surface 1001.

Figure 17:
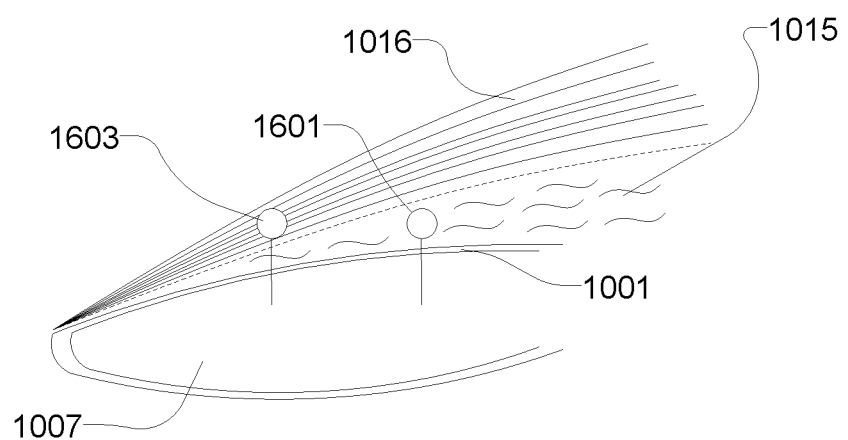
FIG. 17 is a schematic diagram of sensors used in a fluid control system according to an embodiment of the present disclosure.

Referring now to FIG. 17, the deformable surface 1001 is depicted covering the body 1007. In some embodiments, a sensor 4603 measures parameters of the free flow region 1016 of the fluid 1009. A sensor 4601 measures parameters of the boundary layer region 1015 of the fluid 1009. The parameters measured by the sensors 1603 and 1601 may include the fluid flow velocity, the temperature, the fluid pressure and the viscosity of the fluid. In some embodiments, either or both of the sensors 1601 and 1603 transmit their measurements to a control circuit 1017 as depicted in FIG. 11. The control circuit 1017 can use these measurements to calculate parameters associated with surface deformations that result in a modification to the boundary layer of fluid surrounding the deformable surface 1001, to enable the control circuit 1017 to output control signals based on desired modification to the boundary layer.

Figure 18:
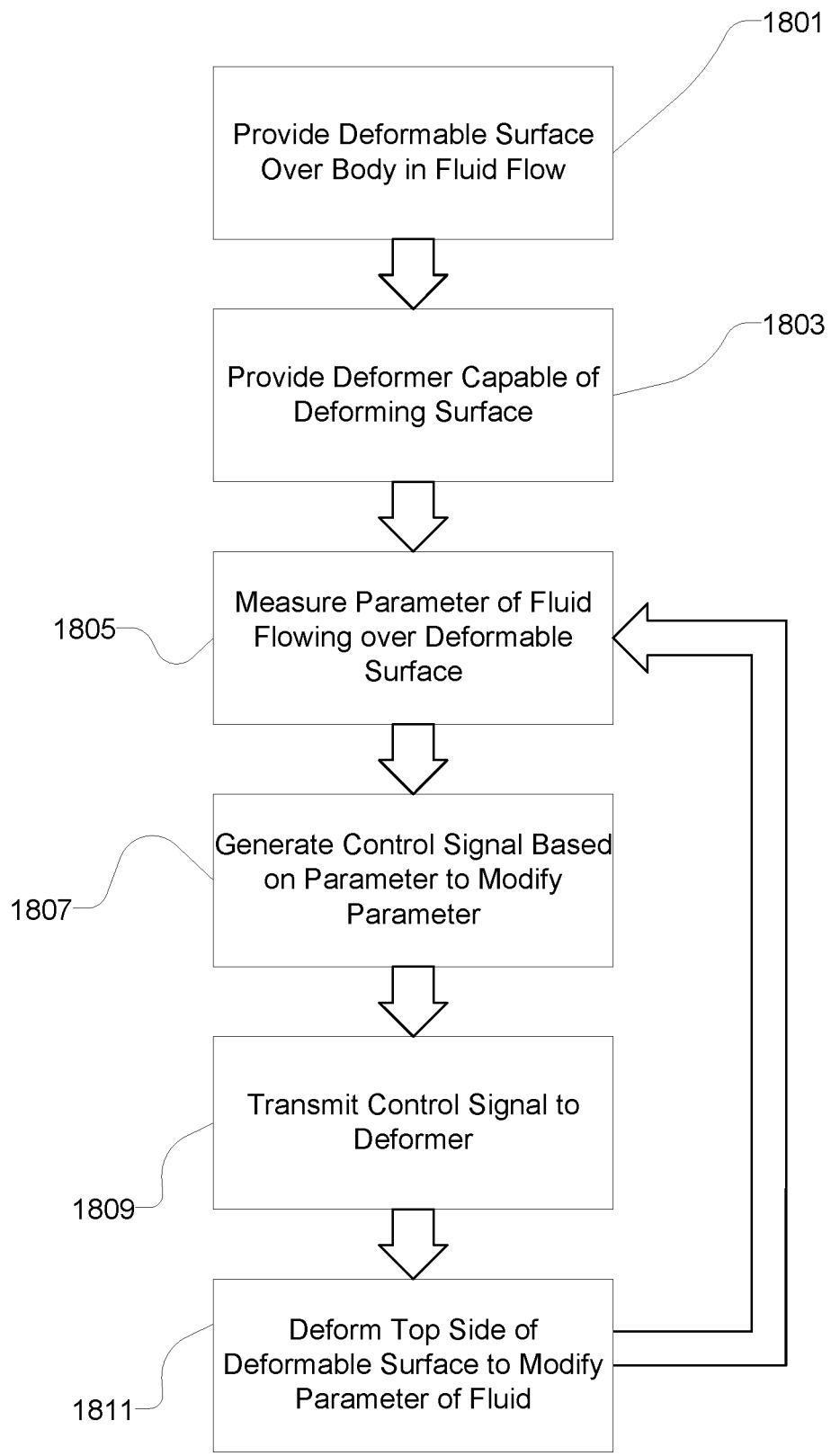
FIG. 18 is a flow diagram of a method for active control of surface drag according to an embodiment of the present disclosure.

Referring now to FIG. 18, a method 1800 of active control of surface drag is depicted. The method can be performed using the fluid control system 1000. At 1801, a surface is provided over a body in fluid flow. The surface can be deformable. For example, the surface can be flexible.

At 1803, a deformer capable of deforming the surface is provided. The deformer can be coupled to the surface, such as an underside of the surface between the surface and the body. Providing the deformer can include providing a plurality of deformers.

At 1805, a parameter of the fluid flowing over the deformable surface is measured. The parameter may include the fluid flow velocity. For example, the parameter can include a velocity of fluid flow in a boundary layer of the fluid flowing over the deformable surface; the parameter can include a velocity of fluid flow in a free stream (free flow) beyond the boundary layer. The parameter can include at least one of a pressure or a temperature of the fluid. In some embodiments, the parameter includes a parameter of the body or a platform that includes the body, such as speed or fuel burn rate.

At 1807, a control signal to modify the measured parameter is generated based on the measured parameter by a control circuit. For example, the control circuit can generate the control signal to achieve a target surface drag, fluid flow velocity, vehicle speed, vehicle fuel burn, or other parameter related to the surface drag of the fluid flowing over the deformable surface.

At 1809, the control signal is transmitted to the deformer. Based on the control signal, the deformer selectively deforms the top side of the deformable surface to modify the parameter of the fluid.

As shown in FIG. 18, the control circuit can execute a control loop by iteratively measuring the parameter of the fluid flowing over the surface, and updating the control signal at each iteration to achieve a desired value of the measured parameter. For example, the control circuit can periodically calculate the velocity of the fluid flow, compare the calculated velocity to a target velocity, and modify the control signal (and thus the deformation of the deformable surface) to reduce the difference between the calculated velocity and the target velocity. In some embodiments, the control circuit can compare a current fuel burn rate of a vehicle that includes the body to a target fuel burn rate, and modify the control signal (and thus the deformation of the deformable surface) to reduce the difference between the current fuel burn rate and the target fuel burn rate.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid control systems and methods of fluid control as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fluid flow control system, comprising:
a surface covering a body in at least a first and second direction, the first direction orthogonal to the second direction, the surface including a bottom side facing the body and a top side opposite the bottom side;
at least one movable section on the top side of the surface, the at least one movable section configured to move along the top side of the surface to modify a boundary layer of a fluid flowing over the surface;
a plurality of springs attached to the at least one movable section; and
a plurality of actuators configured to selectively extend or compress the plurality of springs, the plurality of springs moving the at least one movable section in a translating oscillating motion parallel to the surface.

2. The fluid control system of claim 1, wherein:
the at least one movable section selectively generates surface waves.

3. The fluid flow control system of claim 1, wherein:
the at least one movable section includes a plurality of movable sections that move in opposing directions.

4. The fluid flow control system of claim 1, wherein:
the at least one movable section includes a plurality of movable sections that move in at least one of differing speeds or differing directions.

5. The fluid flow control system of claim 1, wherein:
the at least one movable section includes a plurality of separate movable sections that are positioned on the surface such that there are gaps between each of the separate movable sections.

6. The fluid flow control system of claim 1, comprising:
at least one sensor that measures at least one characteristic of the fluid flowing over the surface.

7. The fluid flow control system of claim 6, wherein:
the at least one sensor measures the flow rate of fluid inside a boundary layer surrounding the surface.

8. The fluid control system of claim 6, wherein:
the at least one sensor measures the flow rate of fluid outside of a boundary layer surrounding the surface.

9. The fluid control system of claim 1, comprising:
a control circuit configured to control operation of the at least one movable section based on a measured property of the fluid flowing over the surface.

10. The fluid control system of claim 9, wherein:
the control circuit causes the at least one movable section to generate a standing wave.

11. A method, comprising:
measuring, by at least one sensor, a parameter of a fluid flowing over a surface, the surface covering a body in at least a first and second direction, the first direction orthogonal to the second direction, the surface including a bottom side facing the body and a top side opposite the bottom side;
generating, by a control circuit, a control signal to modify a boundary layer of the fluid flowing over the surface based on the measured parameter;
transmitting, by the control circuit, the control signal to at least one movable section on the top side of the surface to move the at least one movable section along the top side of the surface;
moving, in response to the control signal, the at least one moveable section to modify the boundary layer of the fluid flowing over the surface; and
selectively compressing, by a plurality of actuators, a plurality of springs attached to the at least one movable section to move the at least one movable section in a translating oscillating motion parallel to the surface.

12. The method of claim 11, comprising:
selectively generating surface waves using the at least one movable section.

13. The method of claim 11, wherein:
the at least one movable section comprises a plurality of movable sections, the method comprising moving the plurality of movable sections in opposing directions.

14. The method of claim 13, comprising:
moving the plurality of movable sections in an oscillatory manner.

15. The method of claim 11, wherein the at least one movable section comprises a plurality of movable sections, the method comprising:
moving the plurality of movable sections in at least one of different speeds or differing directions.

16. The method of claim 11, comprising:
measuring, by the at least one sensor, a velocity of a fluid inside a boundary layer surrounding the surface.

17. The method of claim 11, comprising:
measuring, by the at least one sensor, a velocity of a fluid outside of a boundary layer surrounding the surface.

18. The method of claim 11, comprising:
driving the at least one movable section at a resonant frequency of the at least one movable section.

19. The method of claim 11, wherein:
the at least one movable section comprises a plurality of separate movable sections positioned on the surface such that there are gaps between the separate movable sections.

20. A fluid control system comprising:
at least one sensor operable to measure a parameter of a fluid flowing over a surface, the surface covering a body in at least a first and second direction, the first direction being orthogonal to the second direction, the surface including a bottom side facing the body and a top side opposite the bottom side;
a control circuit operable to generate a control signal based on the measured parameter;
at least one movable section on the top side of the surface, wherein in response to receiving the control signal from the control circuit the at least one movable section moves along the top side of the surface to modify a boundary layer of the fluid flowing over the surface;
a plurality of springs attached to the at least one movable section; and
a plurality of actuators operable to selectively extend and compress the plurality of springs attached to the at least one movable section to move the at least one movable section in a translating oscillating motion parallel to the surface.

21. The fluid control system of claim 20, wherein the at least one movable section comprises a plurality of movable sections, and wherein the plurality of movable sections move in opposing directions in response to receiving the control signal from the control circuit.

22. The fluid control system of claim 20, wherein the at least one movable section comprises a plurality of movable sections, and wherein the plurality of movable sections move in at least one of different speeds or different directions in response to receiving the control signal.

23. The fluid control system of claim 20, wherein the at least one sensor is operable to measure a velocity of a fluid inside a boundary layer surrounding the surface.

24. The fluid control system of claim 20, wherein the at least one sensor is operable to measure a velocity of a fluid outside of a boundary layer surrounding the surface.

25. The fluid control system of claim 20, wherein the control circuit is further operable to drive the at least one movable section at a resonant frequency of the at least one movable section.

26. The fluid control system of claim 20, wherein the at least one movable section comprises a plurality of separate movable sections positioned on the surface such that there are gaps between the separate movable sections.

* * * * *